June 9, 1959 A. D. BRUNDAGE 2,889,933
HOLD-DOWN ASSEMBLIES FOR FILTER CARTRIDGES
Filed Oct. 3, 1955 4 Sheets-Sheet 1

Inventor
ALAN D. BRUNDAGE

June 9, 1959  A. D. BRUNDAGE  2,889,933
HOLD-DOWN ASSEMBLIES FOR FILTER CARTRIDGES
Filed Oct. 3, 1955  4 Sheets-Sheet 2

Inventor
ALAN D. BRUNDAGE

June 9, 1959 A. D. BRUNDAGE 2,889,933
HOLD-DOWN ASSEMBLIES FOR FILTER CARTRIDGES
Filed Oct. 3, 1955 4 Sheets-Sheet 3
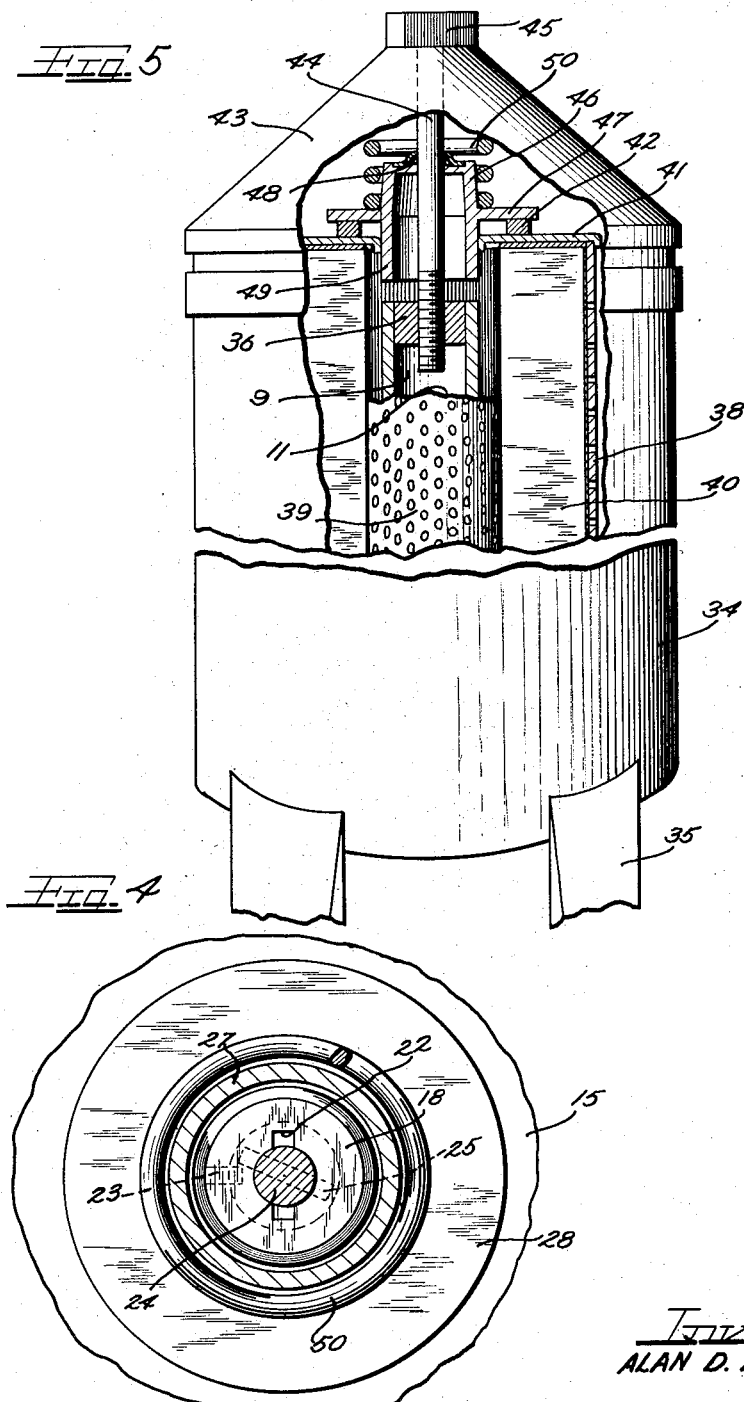
Inventor
ALAN D. BRUNDAGE June 9, 1959  A. D. BRUNDAGE  2,889,933
HOLD-DOWN ASSEMBLIES FOR FILTER CARTRIDGES
Filed Oct. 3, 1955  4 Sheets-Sheet 4
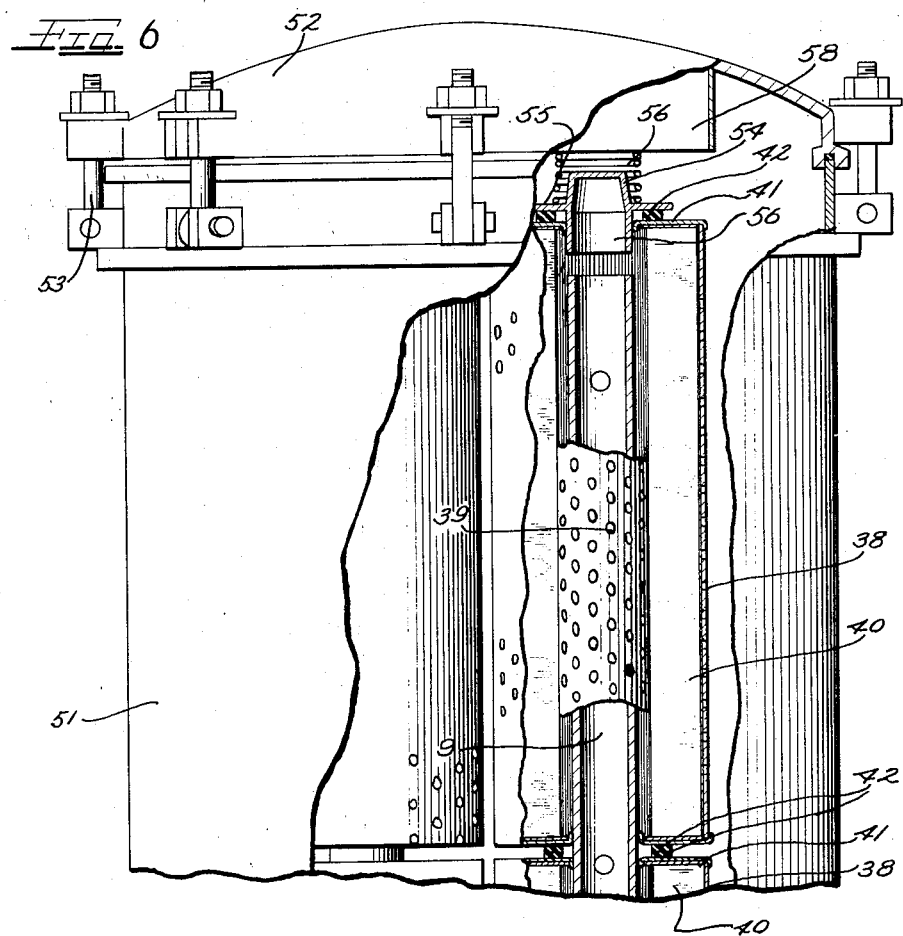
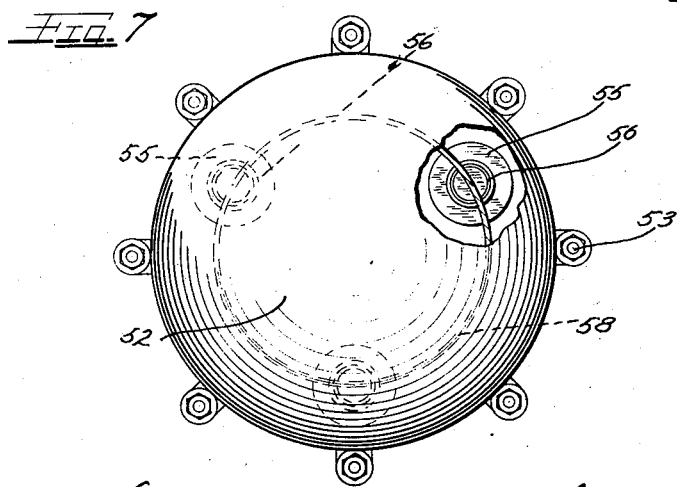
Inventor
ALAN D. BRUNDAGE United States Patent Office 2,889,933
Patented June 9, 1959

1

2,889,933

HOLD-DOWN ASSEMBLIES FOR FILTER CARTRIDGES

Alan D. Brundage, Birmingham, Mich., assignor to Indiana Commercial Filters Corporation, a corporation of Indiana Application October 3, 1955, Serial No. 538,026

2 Claims. (Cl. 210—541)

This invention relates to improvements in hold-down assemblies for filter cartridges, and more particularly to simplified assemblies for holding down a removable and replaceable filter cartridge in a casing around the standpipe, and simultaneously sealing off the cartridge so that fluid is not bypassed into the standpipe around the cartridge, but must pass therethrough, although the invention may have other uses and purposes as will be apparent to one skilled in the art.

Where replaceable filter cartridges are disposed in a filter casing around a standpipe therein, it is necessary to provide a seal between the exterior of the cartridge and the standpipe, and to hold the cartridge firmly in proper position within the casing. Heretofore, expedients have been employed for this purpose which were objectionably expensive to manufacture, objectionably difficult to operate, and which required an objectionably long period of shut down when it was necessary to change filter cartridges. This was especially true with formerly known assemblies of this character, which also have proved unsatisfactory and insufficient on many occasions, particularly where the filter cartridge was of the type having an unstable top dimension. In such a case, extreme difficulty was experienced in effecting a proper seal at the top of the cartridge in order to prevent bypassing of liquid to be filtered.

With the foregoing in mind, it is an important object of the instant invention to provide a hold-down assembly for a filter cartridge, which assembly is easily and expeditiously handled, placed in the proper position of adjustment in substantially a single simple operation, and which effectively holds a filter cartridge in proper position and seals the same off from a standpipe in a filter casing.

Another object of the invention resides in the provision of a hold-down filter cartridge easily mounted in position and which is so constructed as to automatically compensate for unstable or varying dimensions at the top of a cartridge, such for example as a soft filter cartridge.

It is also a feature of this invention to provide a hold-down assembly for a filter cartridge mounted around a standpipe in a casing, which assembly is readily removable as an entire and complete unit from the casing, and simply and easily attached in a manner to exert pressure on the top of the cartridge, by a simple connection with the standpipe in the casing.

Still another object of the invention resides in the provision of a hold-down assembly for a filter element including a stud for connection with the standpipe of the casing inside a filter cartridge, the assembly including positive and extremely economical means of sealing off the assembly around the stud.

A further object of the invention resides in the provision of a hold-down assembly for a filter cartridge disposed in a casing around the standpipe, which assembly is easily and readily disposed in the proper position, and automatically becomes effective for the intended purpose when the cover is applied to the filter casing.

2

It is still another object of the instant invention to provide hold-down assemblies in the form of integral units for disposition over a plurality of filter cartridges disposed in a casing over individual standpipes, each hold-down assembly being easily positionable in position on top of a cartridge, and automatically becoming effective to exert pressure on the top of all the cartridges, and seal them off from their respective standpipes, merely upon the application of the cover to the filter casing.

Still another feature of the invention resides in the provision of a hold-down assembly for filter cartridges effective to exert pressure upon and seal off a cartridge from a standpipe extending therethrough, which assembly is entirely carried by the cover of the filter casing, is automatically removed upon removal of the cover, and automatically placed in operating position when the cover is again mounted on the casing.

A further object of the instant invention resides in the provision of a hold-down assembly for filter cartridges, which assembly is equally suitable for any one of various types of cartridges.

While some of the more salient features, characteristics and advantages of the instant invention have been above pointed out, others will become apparent from the following disclosures, taken in conjunction with the accompanying drawings, in which—

Figure 4 is a fragmentary plan sectional view taken substantially as indicated by the line IV—IV of Fig. 2, looking in the direction of the arrows;

Figure 5 is a fragmentary part side elevational, part vertical sectional view of a filtering device including a cartridge held down by a hold-down assembly of somewhat different construction, but also embodying principles of the instant invention;

Figure 6 is also a fragmentary part side elevational, part vertical sectional view illustrating a filter device containing a cartridge held down by a hold-down assembly of still different construction, but also embodying principles of the instant invention; and Figure 7 is a reduced fragmentary plan view of the structure of Fig. 6, with parts broken away to show structure disposed therebeneath.

As shown on the drawings:

Figure 1:
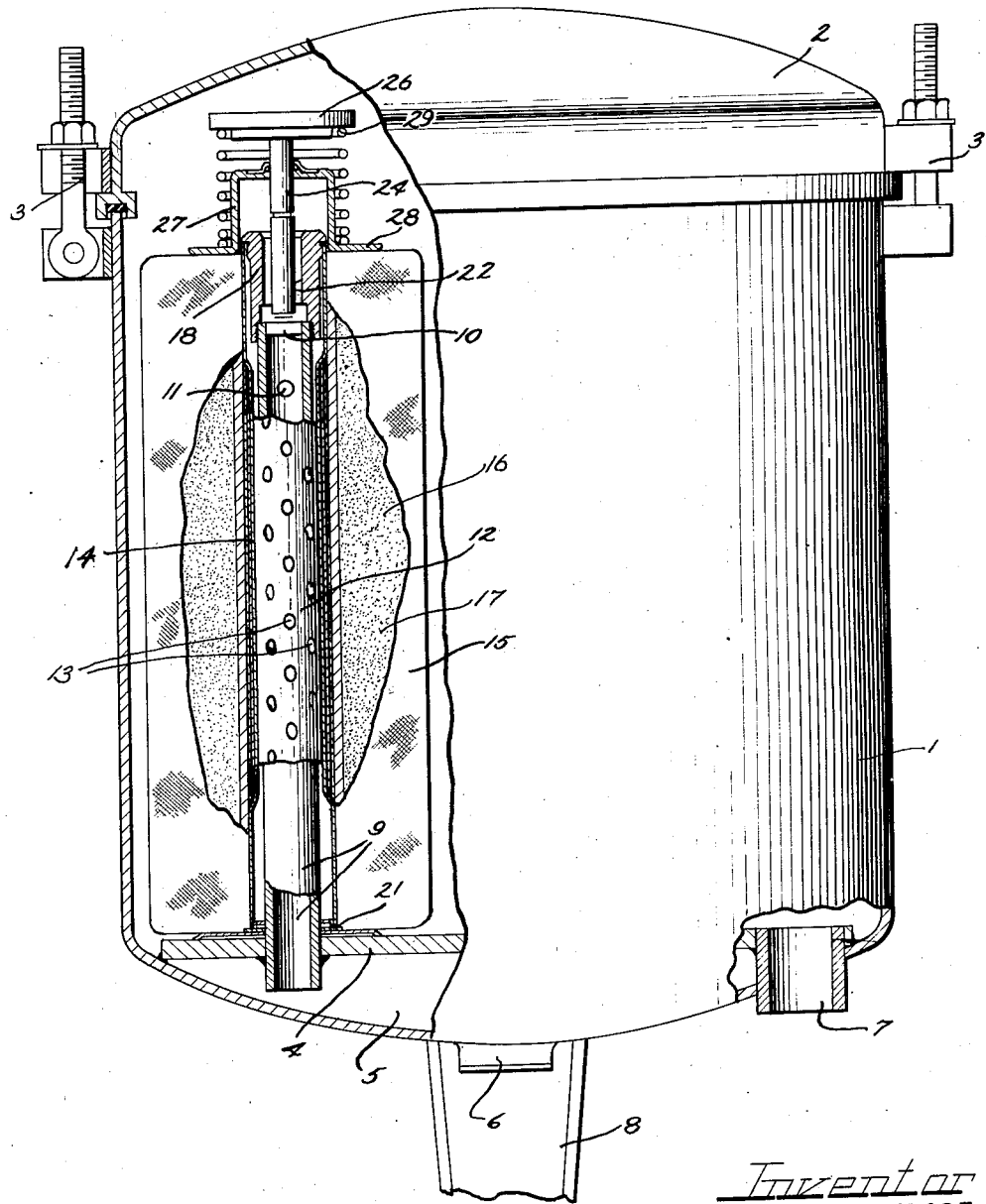
Figure 1 is a part side elevational, part sectional view of a filtering device embodying filter cartridges, held down by hold-down assemblies embodying principles of the instant invention.

With reference now to Fig. 1, it will be seen that the first illustrated embodiment of the instant invention is shown associated with a filtering device comprising a tank 1 having a removable cover 2 therefor, which may be connected to the tank by a plurality of individual pivot bolt assemblies as indicated at 3. In the lower portion of the tank is a fixed transverse plate or partition 4 which defines a filtrate chamber 5 between itself and the bottom of the tank, and a filtrate outlet 6 leads from that chamber 5. The tank is also provided with an inlet opening at 7 which is in the form of a pipe nipple extending through the plate 4, so as to discharge contaminated liquid into the tank above the plate. The tank may be supported in any suitable manner off the floor, such as by one or more legs 8 distributed around the body of the tank.

Figure 3:
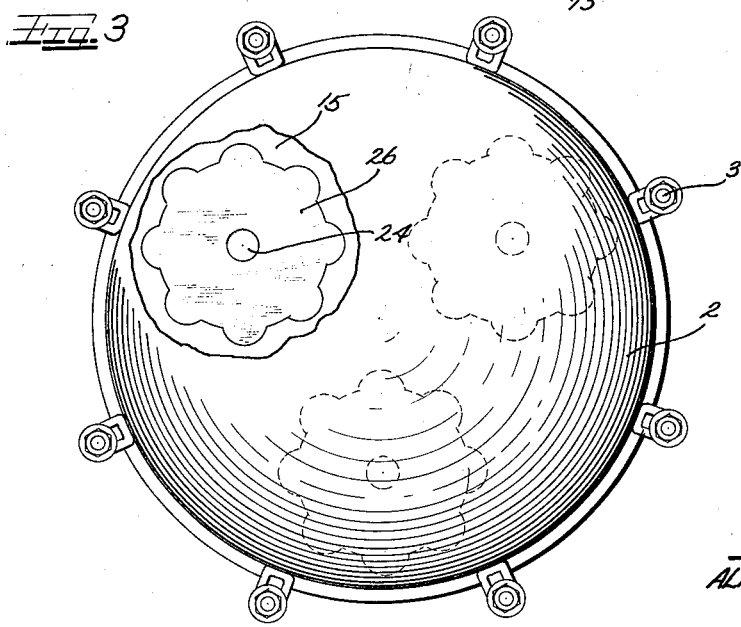
Figure 3 is a reduced top plan view of the structure of Fig. 1, with parts broken away to show structure of parts therebeneath.

It will be understood that the tank 1 is designed to hold a plurality of separate filter elements, there being three such elements included in the tank in the illustrated disclosure, as is apparent from the showing in Fig. 3. However, each filter element is mounted in the same way, and held down by the same assembly as every other element, and consequently only one need be fully illustrated and described herein.

For each filter element or cartridge, the casing 1 is provided with a standpipe 9 which extends through the partition 4, and is welded or equivalently secured to that partition. This standpipe 9 is closed at its upper end as indicated at 10, and may be provided with one or more apertures 11 therein to admit filtrate into the interior of the pipe, the filtrate descending through the standpipe 9 into the chamber 5 for discharge through the orifice 6.

Figure 2:
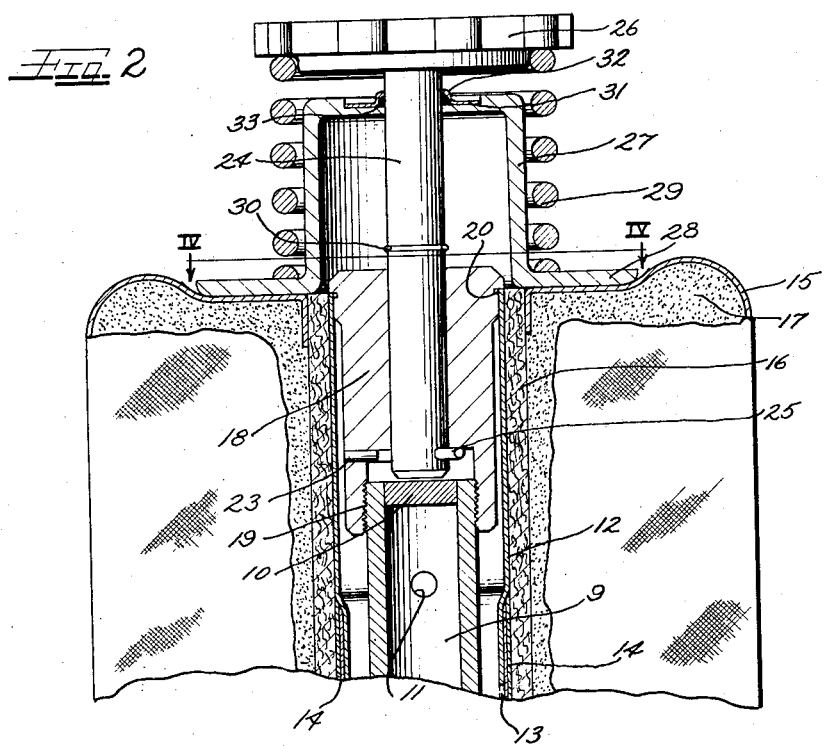
Figure 2 is an enlarged fragmentary vertical sectional view, with parts shown in elevation, of the hold-down assembly itself from Fig. 1, this view being substantially enlarged.

In this particular instance, with reference more particularly to Fig. 2, it will be seen that a center tube is disposed around the standpipe 9 in concentric but spaced relationship therewith, this center tube being generally indicated by numeral 12. The center tube may comprise a metallic tube provided with apertures 13 therein, and the region having the apertures is preferably covered by an exceedingly fine mesh screen 14 or the equivalent to prevent migration of fine filtering medium.

In this instance, the filter cartridge employed is of the soft variety, and may consist of a bag 15 of suitable fabric material, having an opening longitudinally through the center defined by a tube of felt 16 or similar fabric, and in the bag is contained a filter medium 17, which in the illustrated instance is granulated and may satisfactorily be fuller's earth, kieselguhr, diatomaceous earth, or equivalent material. It will be understood that when a soft filter cartridge of this character is made up, the filtering medium has a tendency to settle, both before and when in use. Rough handling may settle the medium so that the top of the bag is not as tightly packed as originally, and during operation when the filter medium becomes oriented by virtue of fluid under pressure passing therethrough, some further settling will occur thereby providing a less dense region at the top of the cartridge. Thus, at least the upper portion of the cartridge is what may be termed unstable as to dimensions, in that there is not a flat fixed surface of uniform dimension for contact by the hold-down assembly, but that assembly must compensate for variances in the density and dimensional characteristics of the upper end of the cartridge.

In the illustrated instance, the hold-down assembly embodies an elongated nut 18 which is threadedly engaged with the top of the standpipe 9 as indicated at 19, thus firmly fixing the nut in position on the standpipe. This nut is preferably provided with an undercut annular shoulder 20 near the top thereof, which shoulder rests upon the center tube 12, and holds that center tube in proper position, both relatively to the standpipe, and also seated firmly upon a gasket 21 at the bottom of the standpipe as seen clearly in Fig. 1.

This nut 18 performs a dual function, namely holding the center tube in proper position, and also acting as an anchor means for the hold-down assembly. As seen best in Fig. 1, the nut is provided with a bayonet slot 22 therein, also visible in plan in Fig. 4. Near the bottom of the nut, but above the connection with the standpipe a transverse stop pin 23 is inserted radially through the wall of the nut, this stop pin acting to limit movement of locking means inserted in the bayonet slot, and now about to be described.

The locking or anchoring means of the hold-down assembly include an elongated stud 24 having a transverse pin 25 extending through the lower end thereof, which pin may be moved downwardly through the bayonet slot 22 in the nut 18, and then rotated until it engages the stop pin 23. This rotation will be but a partial revolution, but will anchor the pin 25 against the bottom of the nut in the region of the slot 22. At the upper end thereof the stud 24 is provided with a hand knob 26 seen best in Fig. 3 which may be serrated to provide a better grip by the fingers of the operator. Disposed around the elongated stud 24 is an inverted cup-like member 27 apertured in the top to accommodate the stud 24, and provided at its lower end with a lateral flange 28 to rest upon the top of the filter cartridge and overlie a goodly portion thereof. Between the hand knob 26 and the flange 28 is a coiled compression spring 29, and one end of this spring is preferably secured as by welding, brazing, or the equivalent to the upper face of the flange 28, and the other end is preferably similarly secured to the underface of the hand knob 26. A spring ring or snap ring 30 disposed around the stud 24 prevents the stud from moving outwardly relatively to the member 27 more than a predetermined distance so as to avoid any possible injury to the assembly.

The instant hold-down assembly provides a very simple and economical way of sealing off the stud 24 to prevent leakage therearound. In the illustrated instance, an annular collar or flange 31 (Fig. 2) is secured to the top of the member 27, and this flange has an offset central portion 32 immediately adjacent the stud 24. In that offset central portion is disposed a sealing ring 33, in the form of an O-ring which may well be made of synthetic rubber or equivalent material.

It will be noted from the foregoing description, that with the exception of the nut 18 secured to the standpipe 9, the entire hold-down assembly is removable and replaceable as a unit. That unit embodies the stud 24 with the hand knob 26 thereon, the member 27 carrying the flange 28, the compression spring 29, and the sealing means around the stud.

In operation, the present invention is extremely simple and effective and requires little effort on the part of the operator. Assuming that a new filter cartridge has just been dropped into position around the center tube 12, it is a simple expedient for the operator to grasp the hand knob 26, pick up the entire hold-down assembly, insert the stud 24 carrying the pin 25 through the bayonet slot in the nut 18 until the flange 28 rests upon the top of the filter cartridge. Then, sufficient pressure is applied downwardly on the hand knob 26 to move the stud sufficiently for the pin 25 to clear the bottom of the nut, whereupon a slight rotation of the hand knob 26 results in locking the parts in position, with adequate compression in the spring 29. This compression is transferred against the flange 28 and in turn on top of the filter cartridge. It will be noted that the structure is sufficiently flexible, that the flange 28 will always firmly contact the top of the cartridge, regardless of the unstable dimension characteristics of the cartridge. In other words, the hold-down assembly automatically compensates for variances in the upper part of the filter cartridge and overcomes all objections heretofore noted in making satisfactory contact with the filter cartridge by assemblies of this type heretofore used. During use, any slack occurring in the upper part of the cartridge by virtue of additional settling of the filter medium therein is automatically compensated for by the compression spring 29 which will take up such slack and maintain the flange 28 forced downwardly into positive contact with the cartridge so there is no danger of bypassing of contaminated liquid.

The liquid to be filtered is introduced into the casing through the inlet 7 under pressure, passes radially through the filter cartridge, and the filtrate descends through the standpipe 9 and ultimately exits from the casing through the filtrate outlet 6.

When it is desired to replace a cartridge, it is a simple expedient to remove the casing cover 2, press upon the particular hand knob 26, rotate it in the reverse direction, and remove the hold-down assembly. Thereafter, the cartridge may be lifted off the center tube 12, and a new cartridge put in place in the manner above described. The entire operation requires a minimum of time, and materially lessens the shut down period of the filtering device.

In Fig. 5 I have shown a different form of the instant invention highly desirable for use with a smaller size filtering device. In this instance, a filter casing 34 supported by feet 35 or in an equivalent manner is shown, and this casing may be provided with inlet and outlet orifices in the same manner as above described in connection with Figs. 1 to 4 inclusive. This casing embodies but a single standpipe 9 of the same character as above described, and the casing is designed to contain only one filter cartridge or a plurality of filter cartridges stacked one on top of the other around the same individual standpipe 9. However, in this instance the standpipe 9 is provided with an inside nut 36 at the top thereof.

In this instance I have illustrated a different type of filter cartridge in use, and this cartridge may comprise an outer apertured protective wrapper 38, an inner perforated center tube 39 which is an integral part of the cartridge, and between these elements a filter element 40 in the form of a long strip of resin-impregnated paper folded to provide numerous radially extending pleats may be utilized. The cartridge is of course provided with annular end caps 41 at each end each of which carries a gasket 42 thereon. This type of cartridge is merely dropped into position around the standpipe 9.

Here, owing to the small size of the casing 34, the hold-down assembly has been associated with the casing cover, and parts of this assembly not only function to compress the spring, but also to hold the cover on the casing. To this end, a cover 43 of substantially truncated conical shape is provided, and through the smaller and central portion of that cover a stud 44 extends having a polygonal head 45 outside the cover. This stud is threaded at its lower end for engagement inside the nut 36 at the top of the standpipe.

The hold-down assembly also embodies a generally cylindrical member 46 closed at the top except for an aperture to accommodate the stud 44, and provided with a laterally extending flange 47 to rest upon the gasket 42 of the filter cartridge. This member 46 may also be provided with a sealing ring structure 48, of the same character as above described in connection with the member 27 in the first embodiment of the invention. The element 46 is also preferably provided with a depending skirt or flange 49 which extends down inside the filter cartridge so as to properly position that cartridge and hold it in that position. Around the member 46 above the flange 47 is a coiled spring 50, and this spring is preferably secured at one end to the upper face of the flange 47, and at the other end to the inside of the cover 43.

Assuming now that it is desired to remove and replace the filter cartridge, it is a simple expedient with a tool such as a wrench to rotate the head 45 and the bolt 44 until it is disengaged from the nut 36 in the standpipe. The cover may then be lifted off the casing and carries the complete hold-down assembly with it. The cartridge may be removed, a new cartridge placed in the casing, the cover placed upon the casing or tank 34, and the bolt 44—45 tightened into position. The tightening of the bolt automatically lowers the cover to some extent, and provides adequate compression of the spring 50 to insure a sealing engagement with the gasket 42 on the filter cartridge. In replacing cartridges with this assembly, no particular thought need be given the hold-down assembly by the operator, because it is automatically placed in operative position merely by placing the cover on the casing and tightening down the bolt 44—45.

In Figs. 6 and 7 I have shown still another form of hold-down assembly embodying principles of the instant invention, and again the placement of the cover in position provides the pressure on the hold-down assembly. In this instance, I have illustrated a casing holding a plurality of filter cartridges, or a plurality of stacks of filter cartridges. A casing 51 is provided which may have an inlet and an outlet opening as above described in connection with Fig. 1, and this casing is provided with a dome-shaped cover 52 held in position by suitable swing bolt assemblies 53. The casing is provided with a plurality of standpipes 9, in the illustrated instance there being three such, and in this instance there is no need for any closure at the top of the standpipe. As seen in Fig. 6, a pair of filter cartridges are shown in stacked relationship, or one on top of the other, over each standpipe 9, and these cartridges are the same as those described in connection with Fig. 5. As seen in the lower portion of Fig. 6, a gasket 42 in the top of the lowermost cartridge rests against a similar gasket 42 on the bottom of the upper cartridge, and when pressure is established an effective seal occurs between the superposed cartridges.

In this instance, the hold-down assembly includes a member 54 having a closed top, and a flange 55 projecting therefrom to seat upon the gasket 42 of the corresponding filter cartridge. This member 54 has a depending skirt or flange 56 to extend inside the center of the cartridge and insure proper positioning of the cartridge. In this general respect the member 54 is of the same character as above described in connection with Fig. 5, but does not have any opening in the top or any bolt or stud passing therethrough. Around the member 54 and preferably secured at its lower end to the upper surface of the flange 55 is a coiled spring 56. The upper end of the coiled spring 56 is free, and it is a simple expedient for an operator to pick up the entire assembly by grasping the upper portion of the spring 56, and place it in position on top of each cartridge assembly within the casing 51. In other words, the spring and member 54 together with its flange 55 is movable as a unit.

In order to provide adequate pressure on the springs 56, the cover 52 is provided with an inside depending skirt or flange 58 which, as seen clearly in Fig. 7, extends across the top of the various springs 56 when the cover is properly mounted on the casing. Thus, by positioning the cover, and anchoring the cover down by way of the swing bolts 53, adequate pressure is provided on the springs 56 to insure proper holding and sealing of the filter cartridge assemblies.

When it is desired to change cartridges, it is a simple expedient to remove the cover 52, then lift out the individual hold-down assemblies by hand, remove the cartridges, replace them with new cartridges, and then drop each hold-down assembly in position over the respective cartridge and replace the cover, giving the hold-down assemblies no further thought or attention, but relying upon pressure of the skirt 58 in the cover to provide adequate pressure on the hold-down assemblies.

From the foregoing, it is apparent that I have provided novel hold-down assemblies for filter cartridges disposed around a standpipe within a filter casing, all of which assemblies are economical to manufacture, highly efficient in action, and long lived. In certain instances, assemblies may be placed in position easily by the hand of the operator, and in one instance an assembly is automatically placed in position by the mere disposition of a cover on the casing. It will also be noted that any of the assemblies herein described may be utilized with substantially any form of filter cartridge, soft or rigid, and are so arranged as to automatically compensate for any unstable or variable dimensional characteristic of the top of a soft cartridge.

It will be understood that modifications and variations may be effected without departing from the scope of the novel concepts of the present invention.

I claim as my invention:

1. In a hold-down assembly for a filter cartridge disposed in a casing around a standpipe, a nut having a bayonet slot therein for securement to the top of the casing standpipe, an inverted cup-shaped member having an aperture in the top thereof, a lateral flange on the lower end of said member to bear on the top of a cartridge, a stud extending through the aperture in said member, a hand knob on the top of said stud, means on the lower part of said stud for selective anchorage in the bayonet slot of said nut, and a compression spring between said flange and said hand knob compressed when said stud is anchored to said nut.

2. In a hold-down assembly for a filter cartridge disposed in a casing around a standpipe, a nut having a bayonet slot therein for securement to the top of the casing standpipe, an inverted cup-shaped member having an aperture in the top thereof, a lateral flange on the lower end of said member to bear on the top of a cartridge, a stud extending through the aperture in said member, a hand knob on the top of said stud, means on the lower part of said stud for selective anchorage in the bayonet slot of said nut, a compression spring between said flange and said hand knob compressed when said stud is anchored to said nut, a flange having a central offset secured to the top of said member around said stud, and a sealing ring in the offset of said flange.

References Cited in the file of this patent
UNITED STATES PATENTS

| | | |
|---|---|---|
| 1,906,565 | Frentzel | May 2, 1933 |
| 2,218,800 | Williams | Oct. 22, 1940 |
| 2,271,054 | Williams | July 27, 1942 |
| 2,454,033 | Briggs | Nov. 16, 1948 |
| 2,543,165 | Harlan | Feb. 27, 1951 |
| 2,568,181 | Zimmerman et al. | Sept. 18, 1951 |
| 2,578,020 | Sandberg | Dec. 11, 1951 |
| 2,680,521 | Kamrath | June 8, 1954 |